(12) United States Patent
Kambara et al.

(10) Patent No.: US 7,846,415 B2
(45) Date of Patent: Dec. 7, 2010

(54) PRODUCTION METHOD OF VAPOR-GROWN CARBON FIBER AND APPARATUS THEREFOR

(75) Inventors: Eiji Kambara, Kawasaki (JP); Tomoaki Yoshida, Kawasaki (JP); Toshio Morita, Kawasaki (JP)

(73) Assignee: Showa Denko K.K., Tokyo (JP)

(*) Notice: Subject to any disclaimer, the term of this patent is extended or adjusted under 35 U.S.C. 154(b) by 297 days.

(21) Appl. No.: 11/658,231

(22) PCT Filed: Jul. 22, 2005

(86) PCT No.: PCT/JP2005/013885

§ 371 (c)(1),
(2), (4) Date: Mar. 12, 2007

(87) PCT Pub. No.: WO2006/009316

PCT Pub. Date: Jan. 26, 2006

(65) Prior Publication Data

US 2007/0258881 A1    Nov. 8, 2007

Related U.S. Application Data

(60) Provisional application No. 60/592,400, filed on Aug. 2, 2004.

(30) Foreign Application Priority Data

Jul. 23, 2004    (JP) .............................. 2004-215912

(51) Int. Cl.
*D01F 9/12*    (2006.01)
(52) U.S. Cl. ................. 423/447.3; 423/447.1
(58) Field of Classification Search .............. 423/447.3, 423/447.1
See application file for complete search history.

(56) References Cited

U.S. PATENT DOCUMENTS

| 4,572,813 A | * | 2/1986 | Arakawa .................... 264/29.2 |
| 4,816,289 A | | 3/1989 | Komatsu et al. |
| 7,390,475 B2 | * | 6/2008 | Kambara et al. ......... 423/447.1 |

FOREIGN PATENT DOCUMENTS

| EP | 1 190 987 A1 | 3/2002 |
| EP | 1 275 759 A1 | 1/2003 |
| JP | 60-054998 A | 3/1985 |
| JP | 62-78217 A | 4/1987 |
| JP | 02-006617 A | 1/1990 |
| JP | 2001-080912 A | 3/2001 |
| WO | WO 99/06618 A1 | 2/1999 |
| WO | WO 02/49412 A1 | 6/2002 |

OTHER PUBLICATIONS

Komatsu, Yasukado et al., "Manufacture of carbon fibers by vapor-phase growth", Chemical Abstracts Service, Database CA 'Online!, Aug. 8, 1987, XP002360523.

* cited by examiner

*Primary Examiner*—Timothy C Vanoy
*Assistant Examiner*—Michelle Hou
(74) *Attorney, Agent, or Firm*—Sughrue Mion, PLLC

(57) ABSTRACT

The invention provides a method of producing vapor grown carbon fiber by vapor-phase reaction conducted by supplying carbon source compounds and a catalyst or a catalyst precursor into a heating zone, wherein at least one of the carbon source compound and the catalyst or the catalyst precursor is solid at room temperature and the solid compound is supplied in gas form into the heating zone from a material supplier filled with the solid material alone at a constant amount. The production method according to the invention enables efficient and stable production of vapor phase carbon fiber even by using a high-volume production equipment.

13 Claims, 2 Drawing Sheets

Fig.1

PRODUCTION METHOD OF VAPOR-GROWN CARBON FIBER AND APPARATUS THEREFOR

CROSS-REFERENCE TO RELATED APPLICATIONS

This is an application filed pursuant to 35 U.S.C. Section 111(a) with claiming the benefit of U.S. provisional application Ser. No. 60/592,400 filed Aug. 2, 2004 under the provision of 35 U.S.C. 111(b), pursuant to 35 U.S.C. Section 119(e)(1).

TECHNICAL FIELD

The present invention relates to a method of stably and efficiently producing vapor-grown carbon fiber such as carbon nanotube and an apparatus used in the method.

BACKGROUND ART

Carbon fiber produced by vapor-phase growth method is collectively called as "vapor-grown carbon fiber" (hereinafter, sometimes referred to simply as "carbon fiber"), and the vapor-phase growth method, which is characterized in features such as enabling easy production of carbon fiber having a high aspect ratio, has been vigorously studied so far and therefore, there are a number of study reports made on the production method for vapor-grown carbon fiber. Carbon nanotube (i.e. carbon fiber whose diameter is in the nanometer order), which has been gathering attention recently, can be synthesized by an applied approach of vapor-phase growth method.

Figure 1:
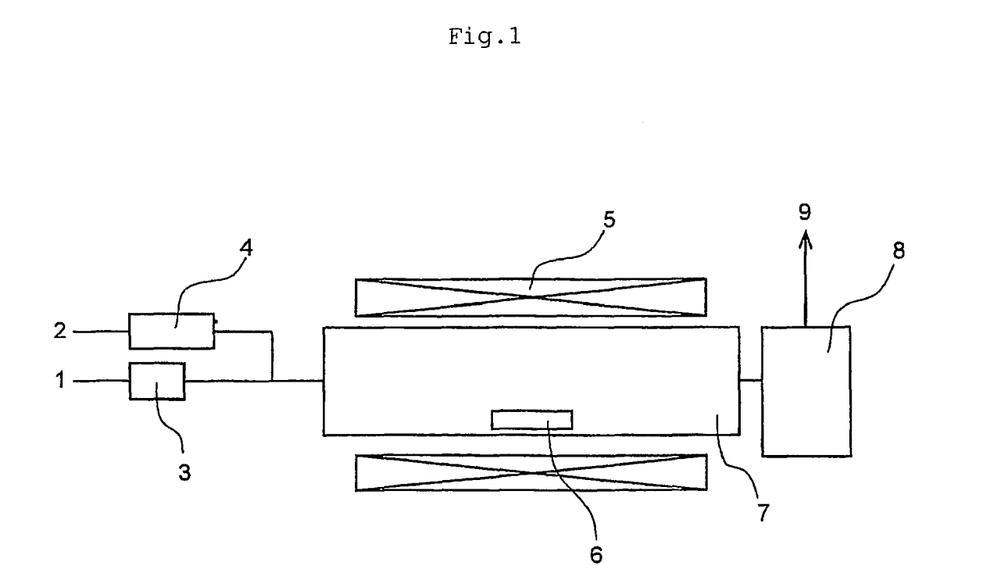
FIG. 1 is a cross-sectional view of a conventional apparatus for producing vapor grown carbon fiber.

FIG. 1 is a cross-sectional view of a typical example of an apparatus for continuously producing carbon fiber by vapor-phase growth method. In FIG. 1, 1 is carrier gas, 2 is material hydrocarbon liquid, 3 is carrier gas flow rate regulator, 4 is carbon source compound gasifier, 5 is heater, 6 is supported catalyst, 7 is reaction furnace, 8 is carbon fiber collector and 9 is waste gas.

An example of the method generally employed is as follows. As raw material, hydrocarbon such as CO, methane, acetylene, ethylene, benzene or toluene is used. If the hydrocarbon material 2 is gas at room temperature, the gaseous material is supplied in gaseous state into the reactor after mixed with carrier gas 1, on the other hand, if the hydrocarbon material 2 is liquid at room temperature, the material is supplied into the reactor either after gasified by gasifier 4 and mixed with carrier gas (an example shown by FIG. 1) or the liquid material is sprayed into the heating zone of the reactor. As carrier gas, nitrogen gas which is an inert gas, hydrogen gas which is reducing gas or the like is employed. As catalyst, a supported catalyst 6 where a metal is supported on a support such as alumina or an organometal compound such as ferrocene is used. In case of using a supported catalyst 6, after subjecting the supported catalyst to necessary pretreatment such as placing the supported catalyst in the reaction zone and heating the catalyst, the hydrocarbon material 2 is supplied into the reactor to react (an example shown by FIG. 1). Alternatively, the catalyst subjected to pretreatment is supplied continuously or pulse-wise from outside the reaction zone to allow the reaction. Further alternatively, an organometal compound such as ferrocene which is a uniform-type catalyst precursor is fed together with the hydrocarbon material into the heating zone continuously or pulse-wise, to thereby produce carbon fiber by using as catalyst, metal particles generated in thermal decomposition of the catalyst precursor. The product generated by the reaction is gathered in the inside of the heating zone or in collector 8 present at the end of the heating zone, and after reaction of a predetermined time, the product is collected.

Methods for producing carbon fiber by vapor-phase growth are roughly classified by process of feeding catalyst or catalyst precursor of the catalyst into the following groups.

(a) method where a substrate or board of alumina or graphite which supports a catalyst or a catalyst precursor is placed in the heating zone, and then the catalyst is contacted with hydrocarbon supplied in gas form;

(b) method where particles of a catalyst or a catalyst precursor is dispersed in liquid hydrocarbon, and supplied continuously or pulse-wise into the heating zone from outside the reaction zone to contact the catalyst with the gasified hydrocarbon at a high temperature;

(c) method where metallocene or a carbonyl compound which is soluble in liquid hydrocarbon is used as a catalyst precursor, and liquid hydrocarbon having the catalyst precursor dissolved therein is supplied into the heating zone, to thereby contact the catalyst with the hydrocarbon at a high temperature; and (d) method where a gas obtained by evaporation by heating a catalyst precursor having a relatively high vapor pressure or by sublimating such a compound is contacted with hydrocarbon gas in the heating zone.

Method (a) requires procedures to be conducted each independently, i.e., spreading a catalyst or its precursor on a substrate, when necessary subjecting the catalyst or its precursor to pretreatment and collecting carbon fiber thereby produced after the temperature lowered and therefore, the production process cannot proceed continuously, which leads to low productivity. Also, the method, involving many steps of preparation of catalyst, coating a substrate with the catalyst, pretreatment of reducing to a metallic state, generation of carbon fiber and collecting produced carbon fiber from the substrate, is economically disadvantageous.

On the other hand, methods (b), (c) and (d) where production process can proceed continuously are more excellent in productivity than method (a).

However, in method (b), in supplying particles of a catalyst or catalyst precursor which have been dispersed in liquid hydrocarbon from outside the reaction zone into the heating zone continuously or pulse-wise, uniform suspension cannot be obtained, which leads to a problem that the supply ratio of hydrocarbon/catalyst cannot be stabilized. In order to solve the problem, a method where suspension with surfactant added thereto is supplied (Patent Document 1) and a synthesis method of single-layer carbon nanotube wherein suspension prepared by suspending in hydrocarbon such as toluene, catalyst particles having a uniform diameter in the nanometer order, i.e. a microemulsion is continuously supplied into the heating zone (Patent Document 2), have been reported. However, they are not necessarily satisfactory methods, and these methods, which require a step of preparing a suspension, is economically disadvantageous.

Meanwhile, method (c) uses as catalyst precursor, metallocene or a carbonyl compound which is soluble in liquid hydrocarbon. In this case, since combination of the hydrocarbon and the catalyst precursor is limited by the solubility, there remains a problem that a necessary amount of the catalyst precursor cannot be dissolved in the hydrocarbon so that the resulting amount of the catalyst is insufficient.

Further, in methods (b) and (c), hydrocarbons usable therein include only those which are liquid at room temperature.

Method (d) where a catalyst precursor is gasified in advance and independently supplied is advantageous in that optimum selection of catalyst source and its concentration can be made freely, unlike method (b) requiring a step of improving dispersibility in hydrocarbon and unlike method (c) where catalyst is limited by solubility in hydrocarbon.

DISCLOSURE OF INVENTION

As an example of method (d), as described in Examples of JP-A-S60-54998, a method wherein a vaporizer containing a catalyst precursor therein is heated to an appropriate temperature and carrier gas is allowed to flow in the vaporizer, thereby supplying a constant amount of the catalyst precursor corresponding to the vapor pressure of the catalyst precursor has been known. In this supplying method, constant supply of the catalyst precursor can be made by precisely controlling the flow rate of the carrier gas and the temperature of the vaporizer. In a small-scale reaction of several grams per hour as in laboratory level, since controlling the flow rate and the temperature is easy, such an approach is employed in many cases.

However, at the practical production level of hundreds of grams per hour, uneven temperature distribution is caused in the vaporizer and it is difficult to obtain a catalyst precursor in an even temperature distribution. As a result, the catalyst precursor cannot be supplied at a constant amount.

Further, also in case of an approach using solid carbon source, due to the disadvantage that constant supply cannot be made, the approach has seldom been employed at the practical production level.

As a result of extensive researches in order to solve the problems, the present inventors have studied on a method of constantly supplying a solid catalyst precursor or a solid carbon source compound and have found a solid material supplier that is unprecedented, thus completing the invention.

Moreover, by using the solid material supplier, the inventors have found out a production method of vapor grown carbon in an unprecedently efficient and stable manner.

That is, specifically, the present invention is as follows.

[1] A method of producing vapor grown carbon fiber, comprising vapor-phase reaction conducted by supplying a carbon source compound and a catalyst or its precursor into a heating zone, wherein at least one of the carbon source compound and the catalyst or the catalyst precursor is solid at room temperature and the solid compound is supplied in gas form into the heating zone from a material supplier filled with the solid material alone at a constant amount.

[2] The method of producing vapor grown carbon fiber according to [1], wherein the catalyst or catalyst precursor is solid at room temperature.

[3] The method of producing vapor grown carbon fiber according to [1], wherein the carbon source compound is liquid at room temperature and the liquid carbon source compound is supplied with a sulfur compound dissolved therein into the heating zone.

[4] The method of producing vapor grown carbon fiber according to [1], wherein controlling of the material amount supplied into a reactor having the heating zone is conducted by regulating the differential pressure between the solid material supplier and the reactor and by adjusting the diameter of the flow path connecting the supplier and the reactor.

[5] The method of producing vapor grown carbon fiber according to [4], wherein the differential pressure is regulated to be almost constant by controlling the temperature of the solid material supplier.

[6] The method of producing vapor grown carbon fiber according to [5], wherein the temperature of the solid material supplier is controlled in such a manner that the inner pressure of the solid material supplier may be almost constant.

[7] The method of producing vapor grown carbon fiber according to [4], wherein the flow path diameter is adjusted by selecting a diameter of a flow path connecting between the solid material supplier and the reactor and/or by using a valve serving as a flow rate controller provided on the flow path.

[8] The method of producing vapor grown carbon fiber according to [1], wherein the material gas supplied from the solid material supplier is mixed with a carrier gas and/or other material gas and then fed into the reactor.

[9] The method of producing vapor grown carbon fiber according to [1], wherein the catalyst or its precursor comprises at least one element selected from a group consisting of typical metal elements and transition metal elements belonging to Groups 2 to 15.

[10] The method of producing vapor grown carbon fiber according to [1], wherein the catalyst or its precursor is an organometal compound.

[11] The method of producing vapor grown carbon fiber according to [1], wherein the ratio of metal atoms in the catalyst or its precursor to carbon atoms in the material compound in terms of atoms is 0.0005 or more.

[12] A vapor grown carbon fiber produced by the production method according to any one of [1] to [11].

[13] An apparatus for producing vapor grown carbon fiber, comprising a reactor in which, as raw materials, carbon source compound and a catalyst or a catalyst precursor are reacted with each other in vapor phase and material suppliers which supply the materials through introduction tubes into the reactor, wherein at least one of the material supplier for the carbon source compound and the material supplier for the catalyst or its precursor is a solid material supplier used for supplying one material which is solid at room temperature alone, the solid material supplier comprising a temperature controller for controlling the inner pressure of the supplier to thereby regulate the differential pressure between the material supplier and the reactor to be constant, so that the solid material is supplied in gas form into the reactor at a constant amount.

[14] The apparatus for producing vapor grown carbon fiber according to [13], wherein a valve for regulating the flow rate is provided in the introduction tube connecting the solid material supplier with the reactor.

[15] The apparatus for producing vapor grown carbon fiber according to [13], wherein a pressure gauge for measuring the inner pressure of the solid material supplier is provided in the solid material supplier and another pressure gauge for measuring the inner pressure of the reactor is provided in the reactor or in the introduction tube.

Owing to the present invention which enables constant supply of the materials, stable operation can be made. Moreover, according to the present invention where carbon fibers can be produced with a small variety in the qualities, solid materials can be used and the kind of carbon source and the kind and amount of catalyst can be arbitrarily selected, and reaction in the high concentration region of the catalyst, which is hard to realize in conventional techniques, can be conducted in an industrial scale.

Hereinafter, the present invention is described more specifically, by referring to drawings when appropriate. In the following description, "part(s)" and "%" in showing amounts and ratios are based on mass, unless otherwise specified.

In the production method of vapor grown carbon fiber according to the present invention, the essential materials are a carbon source compound and a catalyst. Catalyst may be prepared from a catalyst precursor by supplying the precursor into the reactor to become a catalyst therein. Although it is preferable to use a sulfur compound, it is not essential. In the present Description, the term "material(s)" may include catalyst and sulfur compound and further, the term "sulfur compound" may include the elementary substance, sulfur.

(1) Carbon Source Compound

In the production method of vapor grown carbon fiber according to the present invention, the kind of carbon source compound to serve as starting material for carbon fiber is not limited, and a wide range of organic compounds may be used.

Preferred examples of carbon source compound are inorganic gas such as CO and $CO_2$; alkanes such as methane, ethane, propane, butane, pentane, hexane, heptane and octane; alkenes such as ethylene, propylene and butadiene; alkynes such as acetylene; monocyclic aromatic hydrocarbons such as benzene, toluene, xylene and stylene; polycyclic compounds having a condensed ring such as indene, naphthalene, anthracene and phenanthrene; cycloparaffins such as cyclopropane, cyclopentane and cyclohexane; cycloolefins such as cyclopentene, cyclohexene, cyclopentadiene and dicyclopentadiene; and alicyclic hydrocarbon compounds having a condensed ring such as steroid. Further, as derivatives of these hydrocarbons which contain oxygen, nitrogen, sulfur, phosphor or halogen, oxygen-containing compounds such as methanol, ethanol, propanol and butanol, sulfur-containing aliphatic compounds such as methyl thiol, methylethyl sulfide and dimethylthioketone, sulfur-containing aromatic compounds such as phenylthiol and diphenylsulfide, nitrogen-containing or sulfur-containing heterocyclic compounds such as pyridine, quinoline, benzothiophene and thiophene, halogenated hydrocarbons such as chloroform, carbon tetrachloride, chloroethane and trichloroethylene, and as not a compound, natural gases, gasoline, coal oil, heavy oil, creosote, kerosene, turpentine oil, camphor oil, pine oil, gear oil and cylinder oil, may be included in the examples. Those may be used in a mixture.

Among these carbon source compounds, most preferred examples include CO, $CO_2$, methane, ethane, propane, butane, hexane, ethylene, propylene, butadiene, acetylene, benzene, toluene and xylene, and further include naphthalene, anthracene and phenanethrene which are solid at room temperature and mixtures thereof. By using the solid material supplier of the present invention, those carbon source compounds, which are solid at room temperature and are not employed as carbon source in conventional techniques, can be used as carbon source.

(2) Catalyst

Catalyst usable in the present invention is not particularly limited, as far as it can promote the growth of carbon fiber. As a catalyst usable in the invention, at least one metal selected from a group consisting of those belonging to Groups 2 to 15 is exemplified. Further, a preferred example thereof is at least one metal selected from a group consisting of those belonging to Groups 3, 5, 6, 8, 9 and 10 and particularly preferred are iron, nickel, cobalt, ruthenium, rhodium, palladium, platinum and rare-earth elements.

(3) Catalyst Precursor

A catallyst precursor is a compound which decomposes in the heating zone and in some cases is further reduced to give a catalyst. For example, ferrocene, which is a catalyst precursor, decomposes in the heating zone to generate iron fine particles as catalyst. Therefore, as catalyst, compounds which can give such a metal are preferably used. More specifically, examples thereof are metal compounds containing at least one element selected from a group consisting of those belonging to Groups 2 to 15 and preferred are metal compounds containing at least one element selected from a group consisting of those belonging to Groups 3, 5, 6, 8, 9 and 10. Most preferred are compounds containing iron, nickel, cobalt, ruthenium, rhodium, palladium, platinum and rare-earth elements.

Hereinafter, except for cases where "catalyst" and "catalyst precursor" are to be specifically distinguished from each other, the meaning of the term "catalyst precursor" include catalyst itself.

The catalyst precursors which are solid at room temperature are preferably used. Although these catalyst precursor can be used dissolved in solvent such as hydrocarbon, the suppliable amount is limited by the solubility in the solvent and therefore, it is most preferable that solid compound be supplied through the solid material supplier of the present invention.

Preferred examples of the catalyst precursor include organometal compounds such as ferrocene, carbonyl compounds and chlorides. Also, to these compounds as the main component, a metal compound containing at least one element selected from a group consisting of elements belonging to Groups 1 to 17 may be added as a modifying component (i.e., catalytic aid) to thereby modify the catalytic property of the metal as the main component. It is also preferable that the modifying component be a compound which can easily become a gas.

The addition amount of the catalyst precursor is generally about 0.003 as the ratio in terms of atoms of the catalyst metal atoms to the carbon atom in the material compounds (carbon source compound, catalyst precursor, sulfur compound etc.). However, the amount can be 0.01 or more when the solid material supplier of the present invention is used. Thus, as compared to conventional techniques, in the present invention where a large amount of catalyst can be supplied to thereby reduce the temperature for decomposing material hydrocarbon, carbon fiber can be produced at a lower temperature and the carbon fiber thus produced tends to have a small filament diameter.

The preferred range of the addition amount of catalyst in the present invention is 0.0005 or more as a ratio in terms of atoms of the metal atoms in the catalyst or its precursor to the carbon atoms in the material compounds (carbon source compound, catalyst precursor, sulfur compound etc.), more preferably 0.007 or more, and the optimum amount is 0.01 or more.

(4) Sulfur Compound

Further, it is preferable to use a sulfur compound which is known to have an effect of controlling a fiber diameter of carbon fiber. As a sulfur compound, sulfur, thiophene and hydrogen sulfide are preferred. The sulfur compound may be supplied in a gas form or dissolved in hydrocarbon. Also, the carbon source compound or the catalyst precursor compound may contain sulfur. It is particularly preferable to use a sulfur compound which is solid at room temperature and supply it into the heating zone from the solid material supplier instead of supplying a sulfur compound dissolved in hydrocarbon or the like. By this method, it is possible to supply a sulfur compound to a high concentration without being limited by the solubility in solvent or hydrocarbon.

With respect to the total supplied amount of sulfur compound, preferably the sulfur atoms of the sulfur compound against the catalyst metal atoms is 1000 times or less (in atomic ratio), preferably 100 times or less, more preferably 10 times or less. If the sulfur amount supplied is too large, it is not only economically disadvantageous but also can be a cause to inhibit growth of carbon fiber, which is not preferred.

(5) Carrier Gas

In the method for producing vapor grown carbon fiber according to the present invention, it is recommended to use carrier gas in addition to the above components or compositions. Examples of carrier gas include hydrogen, nitrogen, helium, argon, krypton and mixture gas of these gases. However, gases such as the atmospheric air containing oxygen molecules (i.e., oxygen in molecular state: $O_2$) is not suitably used. In some cases of the present invention where the catalyst precursor is in oxidized state, it is preferable to use a gas containing hydrogen as carrier gas. Therefore, preferred is a gas containing hydrogen at 1% or more by volume, more preferably 30% or more by volume, even more preferably 85% or more by volume, for example, a gas of 100% hydrogen or a gas obtained by diluting hydrogen with nitrogen.

(Production Process of Carbon Fiber and Production Apparatus)

Vapor grown carbon fiber can be produced by supplying the above-described carbon source compound, the catalyst precursor, preferably the sulfur compound and further if necessary the carrier gas into the heating zone of the reactor to allow them to contact with each other. At least one of the carbon source compound and the catalyst precursor is a compound which is solid at room temperature, and the solid compound is supplied in gas form into the heating zone at a constant amount through the solid material supplier which only the solid compound is fed in.

The apparatus for producing vapor grown carbon fiber is an apparatus comprising a reactor in which carbon source compounds as raw materials and a catalyst or a catalyst precursor are reacted with each other in vapor phase and material suppliers which supply the materials through introduction tubes into the reactor, wherein at least one of the material supplier for the carbon source compound and the material supplier for the catalyst precursor is a material supplier for supplying only a compound which is solid at room temperature alone. The solid material supplier comprises a temperature controller provided therein for regulating the differential pressure between the solid material supplier and the reactor, so that the solid compound is supplied in gas form into the reactor at a constant amount. Hereinafter, the invention is described more specifically.

(1) Reactor

The reactor (heating furnace) is not particularly limited as far as a predetermined retention time and a predetermined heating temperature can be obtained. In terms of supplying materials and controlling the retention time, preferred is a vertical or horizontal tubular furnace. Although the temperature in the heating zone greatly depends on the kind of the carbon source compound used and the like, generally it is preferably within a range of 500 to 1500° C., more preferably within a range of 600 to 1350° C. If the temperature is too low, carbon fiber does not grow sufficiently while if the temperature is too high, generation of spherical carbon particles becomes prominent or only thick fibers can be obtained, which is not preferred.

The retention time is controlled by the length of the heating zone and the flow rate of the carrier gas. The optimum retention time greatly depends on the reaction apparatus and the kind of the carbon source used. Preferred retention time is generally from 0.0001 seconds to 2 hours, more preferably 0.001 seconds to 100 seconds, most preferably, 0.01 seconds to 30 seconds. If the retention time is too short, the carbon fiber does not grow sufficiently while if the retention time is too long, only thick fibers can be obtained and productivity decreases, which is not preferred.

(2) Method of Supplying Materials

The materials used in the production of carbon fiber according to the present invention are a carbon source compound and a catalyst precursor compound, and further a sulfur compound is used in combination with these materials. In this case, the carbon source compound and/or catalyst precursor, in solid state, independently fill the solid material supplier(s). The term "independently" implies that the solid compound is not dispersed or dissolved in liquid. That is, the solid material supplier is to be filled with a solid compound, or melt or gas of the compound.

In a case where at least one of the carbon source compound and the catalyst precursor is singly supplied into reactor using the solid material supplier, the method for supplying the other material is not limited. For example, when the catalyst precursor is supplied by using the material supplier, the carbon source compound may be mixed with other materials or with compounds other than the materials. Each of the other solid materials including sulfur compound as optional ingredient may be singly supplied through the solid material supplier.

In the present Description, in a case where multiple kinds of carbon source compounds are used, where a catalyst and a catalyst precursor are used in combination and/or where multiple kinds of catalysts or catalyst precursors are used, the clause "at least one of the carbon source compound and the catalyst or the catalyst precursor is solid at room temperature" means that at least one kind of the above-mentioned compounds is solid at room temperature.

For example, as carbon source compounds, a compound which is gaseous or liquid at room temperature and a compound which is solid at room temperature may be used in combination. (Example 1)

The most preferred reaction mode is that a solid catalyst precursor is singly supplied into the reactor from the solid material supplier while the sulfur compound is dissolved in the carbon source compound which is liquid at room temperature and the solution is sprayed inside the reactor or the solution is supplied into a gasifier to be gasified and then into the reactor. Other than this, a method where a solid catalyst precursor is singly supplied into the reactor from the solid material supplier while hydrocarbon and sulfur compound which are gaseous at room temperature are supplied into the reactor, a method where a carbon source compound, a catalyst precursor and a sulfur compound which are all solid at room temperature are used and supplied independently into the reactor from separate solid material suppliers, and a method where a gaseous material is used in combination as carbon source compound in the foregoing method, are also preferred.

From the solid material supplier which contains a single material compound, the material compound is supplied at a constant amount into the reactor. The material contained in the supplier, which is solid at room temperature, is gasified with heat and then supplied in gas form into the reactor at a constant amount. In order to supply the material at a constant amount, for example, the differential pressure between the solid material supplier and the reactor is measured and controlled to be constant. The flow rate in supplying the material at a constant amount may be determined by the diameter of the flow path connecting the solid material supplier with the reactor and the differential pressure. It is preferable to control the differential pressure to a range of 0.1 kPa to 1 MPa. The flow path diameter is determined by selecting a pipe having a diameter desirable for obtaining the desired flow rate or by placing an orifice or the like inside the flow path. Specifically, it is preferable to place a flow-rate controlling valve or the like, particularly a needle valve, in the flow path to thereby control the flow path diameter continuously, and more preferably the control is conducted while keeping the inside pressure of the solid material supplier constant. Since the differential pressure also needs to be constant, the operation of the reactor is performed as the pressure of the reactor is controlled to be constant.

Materials other than the above described materials and the method for supplying other materials are not particularly limited. Any materials, gas or liquid, may be used. However, for the catalyst precursor, usually solid material is used.

In a case where the carbon source compound as the material is gas at room temperature, the compound, after preheated if necessary, is supplied into the reactor. In this case, it is preferable to mix the gas material with carrier gas before supplying into the reactor, for the purpose of obtaining a uniform concentration distribution in the reactor. Further, it is also preferable to previously mix the gas with the catalyst precursor gas as described later.

The temperature for preheating the carbon source compound and the carrier gas is not particularly limited, however, since too high a temperature causes decomposition of the carbon source compound, the temperature is preferably lower than the decomposition temperature of the carbon source compound. If the decomposition temperature of the catalyst precursor is greatly different from that of the carbon source compound, it is preferable that the two gases be separately heated at respectively predetermined temperatures and then supplied into the reactor.

In a case where the carbon source compound is liquid at room temperature, the liquid as is may be supplied into the reactor or the compound may be heated to be gasified and then supplied in gas form into the reactor. Heating and gasifying can be conducted continuously by using a gasifier. As method for supplying the compound in liquid state, any known method may be employed, however, it is preferable, using a spray nozzle, to regulate the liquid droplet diameter, spraying angle and the like.

As method for gasifying the liquid compound and then supplying it into the reactor, the gasified carbon source compound may be supplied into the reactor in the same manner as in the case where the carbon source compound is gas.

In a case where the carbon source compound or the solid catalyst precursor is solid at room temperature, the solid compound may be dissolved in an appropriate solvent and supplied into the reactor in the same manner as in the case where the carbon source compound is liquid. However, it is more preferable that the solid materials be gasified or sublimated by using the solid material supplier and supplied into the reactor.

It is also preferable that these materials be supplied at a constant amount into the reactor similarly to the case where the material is singly supplied. In case of supplying in gas form, the constant supplying is conducted with controlling the differential pressure, regulating the flow rate by using a needle valve and the like, in the same manner as described above. Moreover, in both cases of liquid and solid, it is preferable that the gasified material be mixed with carrier gas and then supplied into the reactor.

(3) Apparatus for Producing Carbon Material

In the present invention, the solid material supplier is an airtight container having at least one material gas outlet, a pressure gauge and a temperature controller used for heating/cooling, and the material gas outlet is connected with a reactor having a heating zone. In order to regulate a flow rate, the diameter of a flow path between the material gas outlet and the reactor may be adjusted or an orifice may be placed in the path. Also, a flow-rate controlling valve may be used, particularly a needle valve is preferably used to regulate the flow rate. In the solid material supplier, the heating energy is controlled not for the purpose of maintaining the temperature of the gas contained therein but for the purpose of regulating the inner pressure of the supplier. The heating may be conducted either from outside the supplier or inside the supplier, as far as necessary energy for constantly supplying the material can be provided.

The material compound is supplied from the material gas outlet of the solid material supplier (airtight container) which is filled with the material compound and the gas thereof substantially alone. The expression "substantially alone" used herein means that preferably the amount of other gases is 5% by volume or less, more preferably 1% by volume or less, most preferably 0.5% by volume or less. When gases other than the materials are present, even if the inner pressure of the supplier is controlled to be constant, the material cannot be supplied at a constant rate, which is not preferred. As an example of the method for filling the container of the material supplier with the material compound or gas thereof substantially alone, the inside of the supplier is depressurized through the material outlet or another opening exclusively used for depressurization to remove gaseous components from the container and then the supplier is heated. Alternatively, another preferred method exemplified is that after purging the supplier with an inert gas such as nitrogen, helium or argon and then heating the supplier, the purged inert gas is discharged from the supplier through the material outlet or another opening exclusively out of the reactor, the material gas is supplied into the reactor.

A pressure gauge may be placed between the material gas outlet of the solid material supplier and the reactor. The invention apparatus comprises a mechanism where the differential pressure measured by this pressure gauge and a pressure gauge present in the supplier is maintained constant, whereby enabling a constant supply of the material. When the pressure fluctuates in the reactor, the differential pressure can be controlled to be constant by controlling the temperature (heating or cooling) of the supplier.

The value of the constant differential pressure is predetermined by the supply amounts of the carbon source compound, the catalyst precursor and the sulfur compound and the diameter of the flow path between the material supplier and the reactor.

The material gas supplied through the material gas outlet is easily condensed due to decrease in the gas temperature and therefore, it is preferable to enhance or maintain the temperature between the material supplier outlet and the reactor. The heating temperature is not particularly limited, however it is preferably the gas temperature in the supplier or higher, more preferably lower than the decomposition temperature of the material compound.

As a preferred example for preventing condensation of the material gas, a method where carrier gas previously heated is introduced to the path of the reactor side of the flow rate regulator placed between the material supplier outlet and the reactor can be mentioned. With respect to the temperature for heating the carrier gas, the optimum value depends on the kind of the material compound, the supply amount of the material gas and the amount of the carrier gas, however, it is preferably the gas temperature in the supplier or higher, more preferably lower than the decomposition temperature of the material compound.

The flow rate of the carrier gas is not particularly limited either, however, the ratio against the amount of the material gas is preferably 0.5 or more, more preferably 0.6 or more.

BEST MODE FOR CARRYING OUT THE INVENTION

Hereinafter, the invention is described in detail by referring to Examples, however the invention is not limited thereto.

The materials and the like used in the following Examples and Comparative Examples are as follows.

[Reagents]

1. Carbon Source Compound benzene: special grade, manufactured by Wako Pure Chemical Industries, Ltd.

anthracene: special grade, manufactured by Wako Pure Chemical Industries, Ltd.

2. Catalyst Precursor ferrocene: special grade, manufactured by ZEON CORPORATION $FeCl_3$: special grade, manufactured by Wako Pure Chemical Industries, Ltd.

thiophene: special grade, manufactured by Wako Pure Chemical Industries, Ltd.

sulfur powder: special grade, manufactured by Wako Pure Chemical Industries, Ltd.

EXAMPLE 1

Figure 2:
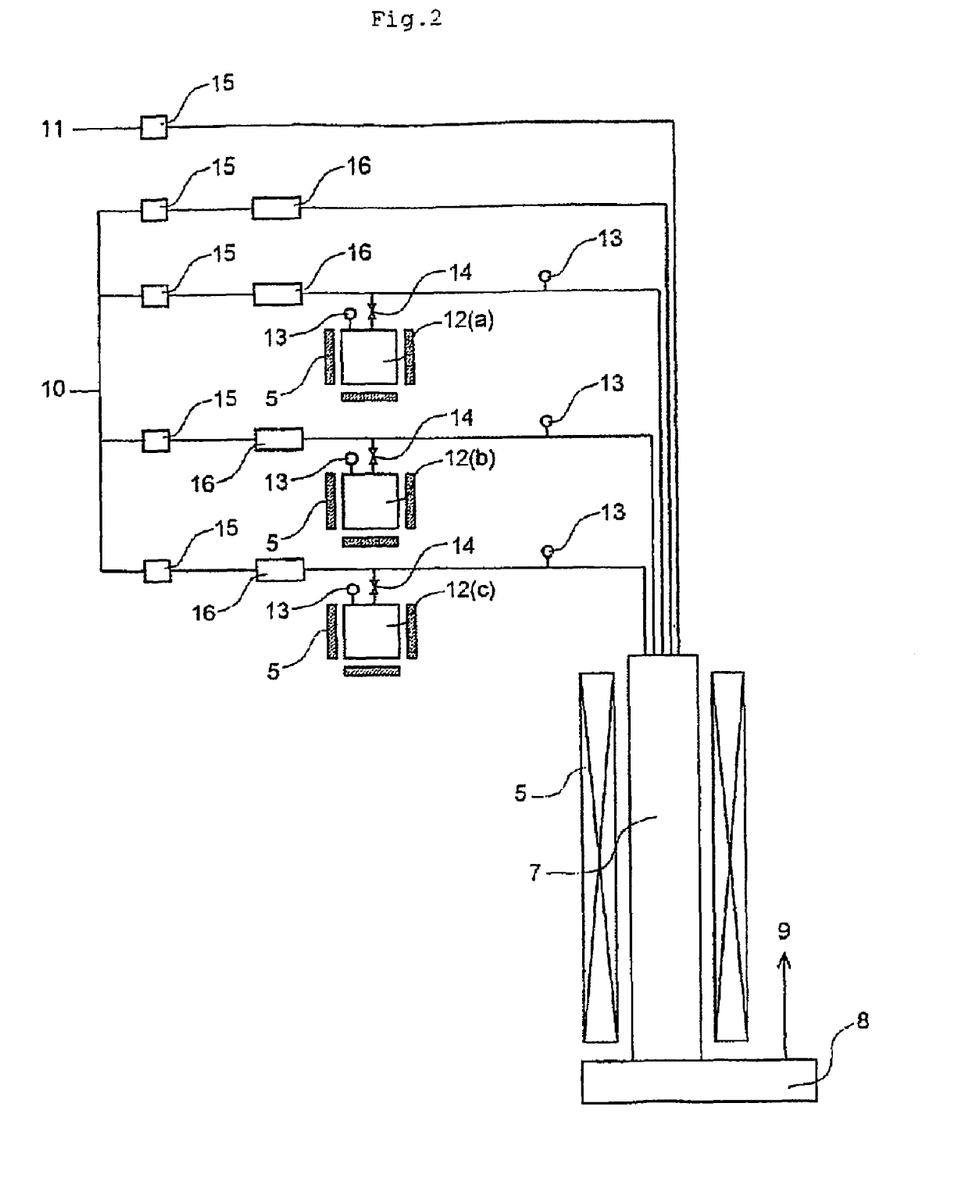
FIG. 2 is a schematic cross-sectional view of one embodiment of the apparatus for producing vapor grown carbon fiber according to the present invention.

FIG. 2 shows the production apparatus used here. Used as a tubular reaction furnace 7 was one made of silicon carbide (140Φ×2600 L), which was equipped with an opening for introducing materials and the like, an outlet for discharging waste gas 9, a carbon fiber collector 8 and a heater 5. To this reaction furnace 7, supply lines for introducing gaseous methane 11 as carbon source, anthracene as another carbon material, $FeCl_3$ as catalyst, sulfur powder as sulfur compound and carrier gas were connected.

In the line for supplying gaseous methane, a flow rate regulator 15 was provided.

In the line for supplying carrier gas, a flow rate regulator 15 and a preheater 16, in this order from the upper stream, were provided.

With respect to the supply lines for introducing gaseous anthracene, $FeCl_3$ and sulfur powder, each of solid material suppliers 12 (a), (b) and (c) was connected to each of the tubular paths connecting the supplier of the carrier gas 10 to the reaction furnace 7. In the solid material suppliers, solid materials were placed respectively at a predetermined amount in advance. In the point attaching each of the suppliers, a needle valve 14 serving as a flow rate regulator was provided. On the tubular path from the attaching point through the upper course, a flow rate regulator 15 for regulating the flow rate of the carrier gas 10 and a preheater 16 were provided, while on the flow path in the down stream, a pressure gauge 13 was provided. Each of these suppliers had a heater 5 and a pressure gauge 13.

The tubular reaction furnace 7 was heated to 1200° C. while supplying nitrogen as carrier gas 10 at a flow rate of 80 NL/min from the path for supplying the carrier gas independently. After the enhancement of the temperature was completed, the nitrogen gas was switched to hydrogen gas. The hydrogen gas was supplied at a flow rate of 200 NL/min while heating it to 400° C. The inside of the solid material suppliers 12 was previously purged with nitrogen, heated, and the nitrogen was completely expelled out of the suppliers. The heating of the material suppliers was conducted so that the inner pressures of the suppliers were kept constant as shown in Table 1. After constant discharge from the suppliers started, each of the material compound gases was supplied into the tubular reaction furnace 7. The amount of hydrogen gas fed into each of the suppliers was 10 NL/min. The supply amounts of the respective materials were controlled through adjustment of the differential pressure by using the pressures measured by the pressure gauge 13 provided in each of the suppliers and the pressure gauge 13 provided in the downstream of each of the tubular paths and adjustment of the valve 14. The flow rate of the hydrogen which was directly fed into the reaction furnace 7 independently without being mixed with a material gas was 200 NL/min and the hydrogen was heated to 400° C. At the same time, methane gas 11 as another carbon source was supplied therein at 5 NL/min. The flow rates of the gases were regulated by using flow rate controllers 15. After completion of the reaction, the reaction product was collected into collector 8 and the carbon ratio of the product against the carbon amount in the materials (methane, anthracene, sulfur and $FeCl_3$) was calculated to be 15%. The product was examined by using an electronic microscope and found to mainly comprise a fibrous component having a filament diameter of 30 nm. The experiment conditions and the materials used in the present Example and also in the Examples and Comparative Examples hereinafter are separately shown in Tables 1 and 2 respectively.

EXAMPLE 2

Thiophene was used instead of sulfur and, the thiophene, which is liquid at room temperature, was supplied through a supply line which was equipped with a gasifier (at a rate of 0.75 g/min.) instead of using a supply line for sulfur as shown in FIG. 2. Ferrocene (1.5 g/min.) was used as catalyst precursor. With respect to the other reaction conditions, the reaction was conducted in the same manner as in Example 1 except that the flow rate of the hydrogen supplied directly into the reaction furnace without mixing with the gas material was 210 NL/min. Here, the gasifier is an apparatus for continuously gasifying the liquid material. After completion of the reaction, the reaction product was collected and the carbon ratio of the product against the carbon amount in the materials (methane, anthracene, thiophne and ferrocene) was calculated to be 20%. The product was examined by using an electronic microscope and found to mainly comprise a fibrous component having a filament diameter of 30 nm.

EXAMPLE 3

Benzene was used as carbon source compound, and thiophene was used as sulfur material. Instead of using supply lines for methane, anthracene and sulfur as shown in FIG. 2, provided was a supply line for supplying reaction solution of the thiophene (5.2 g/min) where thiophene was dissolved in benzene to a concentration of 7.7 mass % while gasifying it with a gasifier. The reaction was conducted in the same manner as in Example 1 except that ferrocene as catalyst (1.2 g/min) was supplied by using the material supplier (12(b) in FIG. 2) and that the flow rate of the hydrogen supplied directly into the reaction furnace without mixing with the gas material was 220 NL/min. After completion of the reaction, the reaction product was collected and the carbon ratio of the product against the carbon amount in the materials (benzene, thiophene and ferrocene) was calculated to be 25%. The product was examined by using an electronic microscope and found to mainly comprise a fibrous component having a filament diameter of 30 nm.

COMPARATIVE EXAMPLE 1

As reaction solution, 18.8 mass % of ferrocene and 6.4 mass % of thiophene were added in benzene (the reaction composition in Example 3), and the mixture was stirred for 1 hour. However, the components could not be completely dissolved.

COMPARATIVE EXAMPLE 2

10 mass % of ferrocene and 1.9 mass % of thiophene were added in benzene (the reaction composition in Example 3), and the mixture was stirred for 1 hour. The components were completely dissolved to form a uniform solution. This solution was used as the material. The material was gasified with a gasifier. The flow rate of the solution which was gasified was 4.54 g/min and the flow rate of hydrogen gas in the gasifier was 20 NL/min. Except the above, the reaction was conduct in the same manner as in Example 1. After completion of the reaction, the reaction product was collected and the carbon ratio of the product against the carbon amount in the materials was calculated to be 12%.

COMPARATIVE EXAMPLE 3

Except that a reaction solution where 6 mass % of ferrocene dissolved in thiophene was supplied at a flow rate 5.3 g/min by using a gasifier and that methane (5 NL/min) was used as carbon source, the reaction was conducted in the same manner as in the Examples. After completion of the reaction, the reaction product was collected and the carbon ratio of the product against the carbon component of the materials was calculated to be 5%.

TABLE 1

| Material suppliers<br>Conditions for operating | Example 1 | Example 2 | Example 3 |
|---|---|---|---|
| FIG. 2 12 (a) | | | |
| Content | anthracene | anthracene | not used |
| Inner pressure kPa | 20 | 20 | |
| Differential pressure kPa | 15 | 15 | |
| Flow rate g/min | 5 | 5 | |
| FIG. 2 12 (b) | | | |
| Content | FeCl$_3$ | ferrocene | ferrocene |
| Inner pressure kPa | 30 | 55 | 55 |
| Differential pressure kPa | 25 | 50 | 50 |
| Flow rate g/min | 1 | 1.5 | 1.5 |
| FIG. 2 12 (c) | | | |
| Content | sulfur powder | not used | not used |
| Inner pressure kPa | 20 | | |
| Differential pressure kPa | 15 | | |
| Flow rate g/min | 0.15 | | |

TABLE 2

| | | | Ex. 1 | Ex. 2 | Ex. 3 | Comp. Ex. 2 | Comp. Ex. 3 |
|---|---|---|---|---|---|---|---|
| Carbon source | methane | NL/min | 5 (g) | 5 (g) | | | 5 (g) |
| | benzene | g/min | | | 4.8 (l) | 4 (l) | |
| | anthracene | g/min | 5 (s) | 5 (s) | | | |
| Catalyst | FeCl$_3$ | g/min | 1 (s) | | | | |
| | ferrocene | g/min | | 1.5 (s) | 1.2 (s) | 0.45 (l) | 0.3 (l) |
| Sulfur source | sulfur powder | g/min | 0.15 (s) | | | | |
| | thiophene | g/min | | 0.75 (l) | 0.4 (l) | 0.09 (l) | 5 (l) |
| Mol ratio | Fe/C | | 0.010 | 0.013 | 0.017 | 0.009 | 0.004 |

The letter in ( ) indicates the state of the substance.
g: gas
l: liquid (or solution containing the substance)
s: solid

INDUSTRIAL APPLICABILITY

The vapor grown carbon fiber of the present invention can be added to various kinds of material such as metal, resin or ceramics to serve as filler material which is used for the purpose of improving electroconductivity or thermal conductivity. Alternatively, it can be used in electron emission materials for FED (field emission display), moreover, it can be used as a medium storing hydrogen, methane or other gaseous substance, or it can be used as filler materials in electrodes for the purpose of improving the properties of the electrodes, and further it can be used in catalysts or the like.

The invention claimed is:

1. A method of producing vapor grown carbon fiber, comprising vapor-phase reaction conducted by supplying a carbon source compound and a catalyst or its precursor into a heating zone, wherein at least one of the carbon source compound and the catalyst or the catalyst precursor is solid at room temperature and the solid compound is supplied in gas form into the heating zone from a material gas outlet of a material supplier filled with the solid material alone which is the solid compound, melt of the compound and/or gas of the compound at a constant amount.

2. The method of producing vapor grown carbon fiber according to claim 1, wherein the catalyst or catalyst precursor is solid at room temperature.

3. The method of producing vapor grown carbon fiber according to claim 1, wherein the carbon source compound is liquid at room temperature and the liquid carbon source compound is supplied with a sulfur compound dissolved therein into the heating zone.

4. The method of producing vapor grown carbon fiber according to claim 1, wherein controlling of the material amount supplied into a reactor having the heating zone is conducted by regulating the differential pressure between the solid material supplier and the reactor and by adjusting the diameter of the flow path connecting the supplier and the reactor.

5. The method of producing vapor grown carbon fiber according to claim 4, wherein the differential pressure is regulated to be almost constant by controlling the temperature of the solid material supplier.

6. The method of producing vapor grown carbon fiber according to claim 5, wherein the temperature of the solid material supplier is controlled in such a manner that the inner pressure of the solid material supplier may be almost constant.

7. The method of producing vapor grown carbon fiber according to claim 1, wherein the material gas supplied from the solid material supplier is mixed with a carrier gas and/or other material gas and then fed into the reactor.

8. The method of producing vapor grown carbon fiber according to claim 1, wherein the catalyst or its precursor comprises at least one element selected from a group consisting of typical metal elements and transition metal elements belonging to Groups 2 to 15.

9. The method of producing vapor grown carbon fiber according to claim 1, wherein the catalyst or its precursor is an organometal compound.

10. The method of producing vapor grown carbon fiber according to claim 1, wherein the ratio of metal atoms in the catalyst or its precursor to carbon atoms in the material compound in terms of atoms is 0.0005 or more.

11. A vapor grown carbon fiber produced by the production method according to claim 1.

12. The method of producing vapor grown carbon fiber according to claim 1, and wherein the flow path diameter is adjusted by selecting a diameter of a flow path connecting between the solid material supplier and the reactor and/or by using a valve serving as a flow rate controller provided on the flow path.

13. A method of producing vapor grown carbon fiber, comprising vapor-phase reaction conducted by supplying a carbon source compound and a catalyst or its precursor into a heating zone, wherein at least one of the carbon source compound and the catalyst or the catalyst precursor is solid at room temperature and the solid compound is gasified with heat and then supplied in gas form into the heating zone from a material gas outlet of a material supplier filled with the solid material alone which is the solid compound, melt of the compound and/or gas of the compound at a constant amount.

* * * * *